United States Patent Office 2,789,004
Patented Apr. 16, 1957

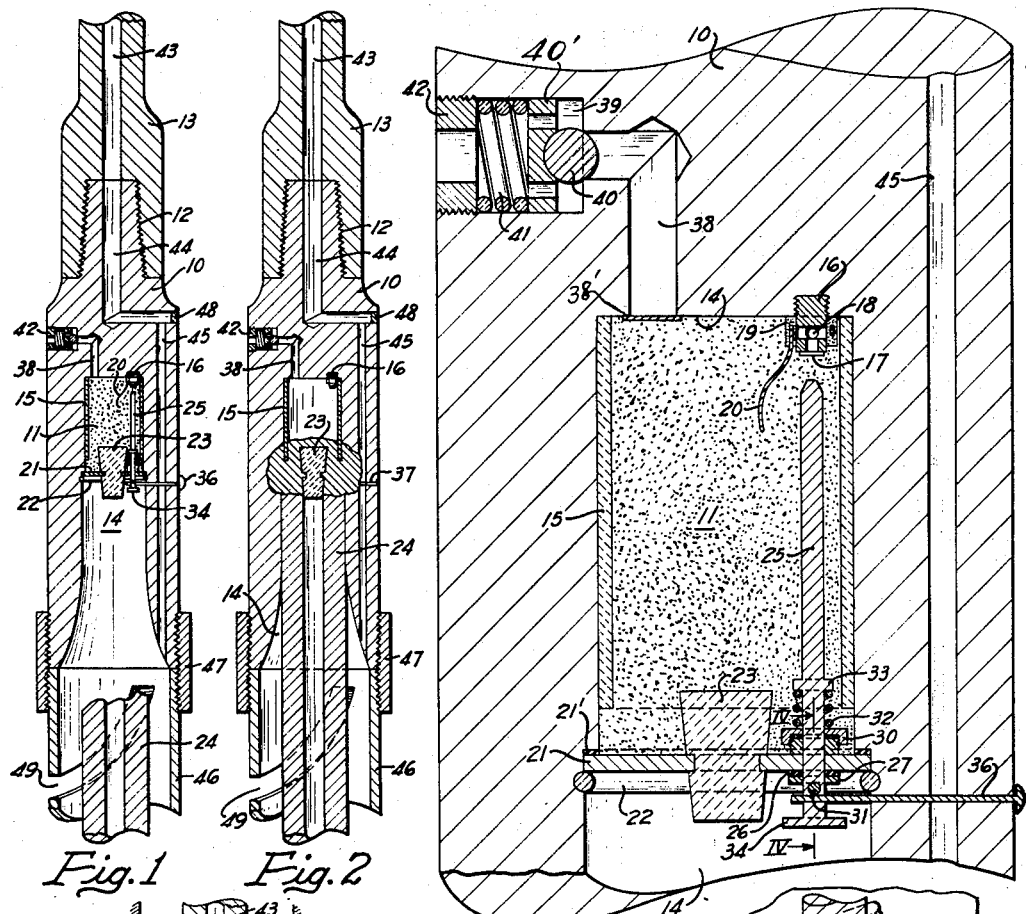

2,789,004

METAL FISHING TOOL

Henry C. Foster, Wexford, Pa.

Application March 17, 1954, Serial No. 416,891

6 Claims. (Cl. 294—86)

This invention relates to fishing tools. More particularly the invention relates to fishing tools for attachment to iron or steel objects which are located in a deep well, such as an oil or gas well, to remove such objects from the well.

During the drilling and operation of oil, gas and water wells, metal objects such as pieces of steel tubing, drill pipe, drill bits and other metal parts of drilling apparatus become free and lodge in the bottom of a well. Generally these objects must be removed before the well can be properly operated. If the fish in the well is in the form of a tubular member with the bore of the tube substantially parallel with the axis of the well, such a fish may be secured to my projectile type fishing tool which is illustrated and described in application Serial No. 416,820, filed March 17, 1954.

Sometimes the shape of the upper end of a tubular member is such that a projectile type fishing tool is not effective in obtaining a strong hold on it. I have found that a tool which may be attached to the fish by welding is well adapted for removing most any form of fish.

The primary object of the present invention is to provide a fishing tool which may be effectively attached to an iron or steel fish by welding.

Another object of the invention is to provide a fishing tool which may use thermite or other exothermic iron melting material for welding in attaching the tool to the metal object to be withdrawn from the well.

A further object of the invention is to provide a fishing tool by which the metal fish may be brought into proper position for attachment to the tool, and by such contact put the welding mechanism into operation to attach the fish to the tool.

With these and other objects in view, the invention consists in the fishing tool herein illustrated and described and particularly defined in the claims.

The various features of the invention are illustrated in the accompanying drawings, in which:

Fig. 1 is a vertical sectional view of the preferred fishing tool showing the tool charged with thermite welding material preparatory to making a welding connection to a fish;

Fig. 2 is a vertical sectional view of the fishing tool showing its welded connection to a tubular fish;

Fig. 3 is a detailed sectional view showing that portion of the welding barrel which is loaded with a thermite charge;

Fig. 4 is a detailed sectional view of the mounting of the trigger for igniting the thermite charge;

Fig. 5 is a vertical sectional view of the fishing tool showing its welded connection to a solid mass of ferrous metal;

Fig. 6 is a detail sectional view illustrating an apparatus by which the thermite charge may be ignited manually by dropping an igniting weight down the bore of a drill pipe; and Fig. 7 is a detail sectional view showing the use of a spark plug with an electrical apparatus for igniting a thermite charge manually from the top of the well.

The fishing tool of the present invention is well adapted for fishing for most any type of ferrous metal fish which might become lodged in the bottom of a well. The tool consists of a welding barrel 10, having a thermite welding cartridge 11 mounted therein, and having a thread connection 12 in its upper end for connection to the ordinary drill pipe 13 or a cable socket (not shown). It is preferred to use the present fishing tool with a drill pipe which is connected to the tool and used for conducting the tool to the bottom of the well, and for drawing the tool out of the well. A cable socket, when used with the tool, uses a cable for lowering the tool into the well and for drawing the tool and a fish out of the well.

The terms thermite cartridge and thermite material as used herein refer to any well known mixture of powdered iron oxide and aluminum which when ignited produces iron and aluminum oxide by a chemical reaction such as: $8Al + 3Fe_3O_4 \rightarrow 9Fe + 4Al_2O_3$. The heat of the reaction converts the iron to molten metal and also melts portions of the adjacent tool member and fish to effect the desired weld between the fish and tool.

The welding barrel 10 has a reinforced wall forming a chamber 14, in the upper end of which is mounted the thermite cartridge 11. The inside of the chamber in which the thermite cartridge is mounted preferably has a molded asbestos lining 15 which forces the molten thermite welding material to flow down toward a fish which is being connected to the tool by the molten thermite material. The lining 15 (Figs. 1 and 3) does not extend to the bottom of the thermite chamber, but it allows a portion of the chamber to be in direct contact with the thermite material so that the molten thermite material will unite with the metal of the barrel as illustrated particularly in Fig. 2. A primer holder 16 (Fig. 3) is mounted in the upper end of the chamber 14 and has an opening for receiving a mercury fulminate primer 17. A series of holes 18 are mounted in the holder which communicate with a silk powder ring 19. One or more magnesium fuses 20 are connected with the silk powder ring which are ignited when the primer cap sets the powder on fire for the purpose of igniting the thermite material.

The cartridge of thermite material is held in position in the upper end of the chamber 14 by means of a metal plate 21 which tightly fits on the inside of the bore of the chamber 14 and is held in position by means of a clamping ring 22. A gasket 21' is mounted between the plate 21 and the wall of the welding barrel to provide a gas-tight fit of the plate with the wall of the barrel. When the tool is used for the purpose of fishing to obtain a tubular fish, an asbestos plug 23 is mounted in a central opening in the plate 21 for the purpose of closing an opening in a tubular fish 24 as illustrated in Fig. 2. The plug prevents the molten thermite material from flowing down into the interior of the fish, and concentrates the thermite material on making a connection between the fish and the inside of the welding barrel.

The thermite material of the cartridge is ignited by means of a firing pin 25 which is mounted within the cartridge and extends through the plate 21. To make the thermite cartridge chamber tight, a packing gasket 26 (Fig. 4) is mounted around the pin 25 between a washer 27 and the plate 21. Another sealing gasket 28 surrounds the pin 25, and is mounted between a threaded collar 29, welded to the plate 21, and a packing gland 30. The firing pin is normally held in retracted position by means of a shear pin 31 which passes through the pin 25 and bears against the bottom of washer 27 (see Figs. 3 and 4). The firing pin is normally urged to strike the firing primer 17 by means of a compression spring 32 which is mounted between a shoulder 33 on the pin and the packing gland 30. A contact head 34 is mounted on the bottom of the firing pin for the purpose of engaging a fish, and when the pressure of the firing pin against the fish is sufficient to shear the pin 31, the firing pin will be projected forcibly against the primer 17 by the spring 32 to ignite the thermite charge. As a safety precaution to prevent the thermite charge from becoming ignited when the tool is not used for fishing, a safety pin 36 is extended through the barrel 10 and passes through an opening 37 in the pin to prevent the pin from being moved into engagement with the fulminate primer 17. The pin 36 is mounted in safety position while the tool is being transported to the place of use, and is only removed after the tool is connected with the drill pipe or cable to be lowered into the well.

When the thermite charge is ignited to melt the material of the charge, gases are generated, and it is very desirable to remove these gases from the thermite chamber. To accomplish this several valved outlets from the thermite chamber 14 are provided to release the gas. Only one valved outlet is illustrated in the drawings. Each of the valved outlets comprises a channel 38 in the welding barrel 10 extending upwardly from the thermite chamber 14 to a releasing chamber 39 in the side of the barrel 10. A ball relief valve 40 is mounted in the chamber 39 to normally close the channel 38. The ball 40 is held in closed position by means of a spring 41 which is compressed between a ball plate 40' and a nut 42 threaded into chamber 39. An opening in the nut 42 allows gas which passes the ball 40 to escape from the tool. To hold the thermite charge in the chamber 14, a combustible cover 38' such as cardboard is mounted in the bottom of the channel 38. When the gases of the burning thermite develop a sufficient pressure to overcome the compression of the springs 41, the ball valves 40 will be opened to release the gas to the outside of the tool. In the meantime the covers 38' will burn and disappear.

When operating the tool to remove a tubular fish from the well, it is often desirable to introduce a liquid such as water or mud under pressure through the tool to wash sand or other impeding material away from the upper end of the fish in order to permit the tool to be moved down into engagement with the contact head of the firing pin 25, and to position the fish for welding to the welding barrel. For this purpose the tubular bore 43 in the drill pipe 13 communicates with a bore 44 in the welding barrel. A series of channels 45 extend from the bore 44 down through the welding barrel to introduce water or mud around the outside of the fish as the tool is moved down by gravity to position the fish for welding purposes. The washing operation should be active to clear the fish of obstructions so that the fish will be in a welding position in the welding barrel before the firing pin contacts the fish. The arrangement of the firing pin with reference to the frustro-conical section of the chamber 14 requires a comparatively clean fish in order to have the fish pass up in the chamber 14 to contact with the contact head 34.

To assist in positioning a tubular fish in proper position in the welding barrel for connection therewith, a sleeve 46 is connected to the bottom of the barrel by a thread connection with a coupler 47. Preferably a helical slot 49 is formed in the side wall of the sleeve 46 to help position a tubular fish for connection to the welding barrel.

It will be seen from Fig. 2 that when the fish is welded to the welding barrel 10, the barrel is generally put into such a condition that it cannot be used again. The welding operation, however, does not connect the sleeve 46 with the fish so that the sleeve may be disconnected and reused, whereas the welding barrel will generally be discarded. Furthermore the inside chamber of the welding barrel should have a diameter which will closely approximate the diameter of the tubular fish in order to secure a good welding connection between the fish and the barrel.

In Fig. 5 is shown a form of the fishing tool for attachment to a fish which is a mass of material which may or may not have an opening therein. This form of tool preferably does not use a sleeve 46 and the flared bottom of the welding barrel is shortened to permit the odd shape of ferrous metal to come into contact with the head of the firing pin 25 to ignite the thermite welding material. When fishing for metal of the type illustrated in Fig. 5, it is best to use a plate 21 at the bottom of the thermite chamber 14 which has no hole or plug in it.

After the fish has been fused with the welding barrel, it is generally preferable to provide a lubricant around the barrel to assist in moving the fish out of the well. To this end plugs 48 are mounted in channels 44 (Figs. 1 and 2) which may be removed by increasing the pressure of the liquid introduced through the channel to permit the liquid to pass around the outside of the welding barrel. This liquid may be water, mud or a lubricant.

It will be apparent that the above-described fishing tool is well equipped for removing any type of fish which may be made of iron or steel which is herein referred to as a ferrous material. Bars or rods such as sucker rods often lodge in the bottom of the well and the tools of types shown in Figs. 1 and 3 may be used for fishing such rods out of a well. A plate 21 having no hole or plug therein may preferably be used in fishing for rods.

For some fishing jobs it is desirable to have manual control of the ignition of the thermite charge to prevent misfire under adverse conditions and to insure that the tool is properly positioned on the fish before the thermite charge is ignited. In Fig. 6 is illustrated a thermite ignition mechanism which may be used in the welding barrel in place of or in conjunction with the type of ignition mechanism illustrated in Figs. 1, 3, and 4. All other features of the tool would be the same as that illustrated in Figs. 1 and 3. The mechanism of Fig. 6 comprises a firing pin 50 mounted in a hole 51 positioned in the welding barrel 10 above the thermite charge in the barrel. The bore of the hole 51 is in direct alignment with the bore 43 in the drill pipe 13. The firing pin is held in position in the hole 51 by means of a packing washer 52 which is compressed between nuts 53 and 54 that are threaded into a chamber 55 in the upper end of the welding barrel. The nuts 53 and 54 compress the packing washer to make a packing joint with the firing pin in order to prevent liquid under pressure from entering thermite chamber 14 through the hole 51. The firing pin is normally held in elevated position above a fulminate primer 56 which is mounted in an opening 57 that extends from the bottom of the hole 51 into the top of the thermite chamber. The firing pin is locked in the elevated position by means of a shear pin 58 which extends through the pin 50 and rests on top of nut 54 to prevent the pin from coming into contact with the primer except when the pin 50 has been struck with sufficient force to shear the pin 58 and to drive the firing pin into contact with the fulminate primer 56. The ignition of the thermite charge by the firing pin is controlled manually by introducing a firing weight 59 in the bore 43 of the drill pipe and allowing the weight to fall from the surface of the well to the tool to strike the upper end of the firing pin with a strong force to shear the pin 58 and fire the primer 56. The flame of the primer contacts a powder fuse 60 positioned below the hole 57 to ignite the powder and magnesium ribbons 61 which extend between the powder charge 60 and the thermite charge in the chamber 14. The magnesium ribbon is very effective in igniting the thermite charge and after the thermite charge has been ignited it will continue to burn until the iron material therein has been melted and the oxygen materials therein are used up. The gases formed in the ignition pass out through the passageway 38 as described above.

If the fishing tool is connected by a cable socket with a cable for handling the tool in the well an ignition mechanism such as illustrated in Fig. 7 may be used for igniting the thermite charge to effect the welding of the tool to a fish. It will be understood that the mechanism illustrated in Fig. 7 may replace or be used in conjunction with the thermite igniting mechanism illustrated in Figs. 1 and 3. All other features of construction of the tool would be the same as those illustrated in Figs. 1, 3, and 5. The ignition mechanism of Fig. 7 consists of a spark plug 62 which is mounted in the side wall of the welding barrel 10 with the electrodes or points of the spark plug projecting into a powder head 62' in the chamber 14. The spark plug is mounted in a chamber 63 in the welding barrel and is threaded therein to securely hold the plug in position and to close the opening in which it is mounted. An electrical ignition wire 64 is connected to the spark plug which passes through a plastic plug 65 from which it leads to an ignition apparatus at the top of the well. The electrical conductor 64 is carefully insulated to permit high voltage charge to be placed on the spark plug for making a spark sufficiently hot to ignite powder head 62' which in turn ignites magnesium ribbons 66. The plastic insulating plug 65 is threaded into the chamber 63 and a gasket 67 is used between the plug 65 and the wall of the welding barrel to effectively seal the spark plug in the chamber 63 and prevent moisture from coming into contact therewith. The gases formed when burning the thermite charge are expelled through an exhaust opening 38 as illustrated in Figs. 1, 3, and described above.

The preferred form of the invention having been thus described, what is claimed as new is:

1. A fishing tool for removing metallic fish from the interior of wells, in combination a welding barrel having a central chamber therein opening inwardly from the bottom of the barrel for a portion of the longitudinal length of the barrel, a channel extending upwardly from said chamber and a cross channel extending inwardly from the barrel side wall to connect with the first channel, a valve member in the cross channel opening outwardly from pressure within the upwardly extending channel, an open ended insulating hollow cylindrical member disposed in the chamber and extending downwardly from the inner end of the said chamber, a thermite cartridge disposed within said chamber, a fusible member retaining the cartridge in the chamber, means on the barrel for selectively igniting the said cartridge after the barrel is engaged by the fish adjacent the barrel chamber, said fusible member releasing the molten thermite charge against the fish for welding the fish and barrel together, and a member secured to the upper end of the barrel for inserting and removing the barrel from the well.

2. The fishing tool as in claim 1 wherein an extension is formed on the barrel, an opening through the extension connects with the barrel central chamber for receiving the fish, and the bottom portion of the extension opening is flared outwardly to guide the fish to adjacent the fusible member in the barrel chamber.

3. The fishing tool as in claim 2 wherein the fusible member in the barrel chamber has a non-fusible plug mounted therein for closing the central opening in the fish.

4. The fishing tool as in claim 1 wherein the means for igniting the thermite cartridge comprises, a primer mounted within the thermite chamber wall and when actuated ignites the thermite, a firing pin is mounted in the barrel and is normally spring urged to actuate the primer, said firing pin having an end portion extending below the thermite cartridge chamber to be engaged by the fish, and a shear pin extending through said firing pin to normally hold the firing pin out of engagement with the primer and against the action of said spring.

5. The fishing tool as in claim 1 wherein the tool is attached to a drill pipe, a firing pin is mounted in the welding barrel in alignment with the bore of the drill pipe, said firing pin being held in position to strike a primer communicating with the thermite charge for igniting the charge and a firing weight shaped to fall freely through the bore of the drill pipe to strike the firing pin to ignite the thermite charge.

6. The fishing tool as in claim 2 in which a channel extends through the welding barrel arranged to communicate with the bore in the drill pipe and to distribute fluid around a fish adjacent the lower end of the barrel, said channel having an opening to the outside of the tool which is normally closed by a plug, said plug being removable by a high fluid pressure in the channel to distribute fluid around the tool.

References Cited in the file of this patent

UNITED STATES PATENTS

| 1,415,516 | Bridge | May 9, 1922 |
| 2,154,654 | Armentrout et al. | Apr. 18, 1939 |
| 2,218,131 | Gipson et al. | Oct. 15, 1940 |
| 2,225,028 | Banks | Dec. 17, 1940 |
| 2,482,093 | Carlson | Sept. 20, 1949 |
| 2,515,191 | Carpenter et al. | July 18, 1950 |

FOREIGN PATENTS

| 498,516 | Great Britain | Jan. 5, 1939 |